May 7, 1935.　　　　　S. PAUL　　　　　2,000,351
VEHICLE LOADING DEVICE
Filed Dec. 5, 1934　　2 Sheets-Sheet 1
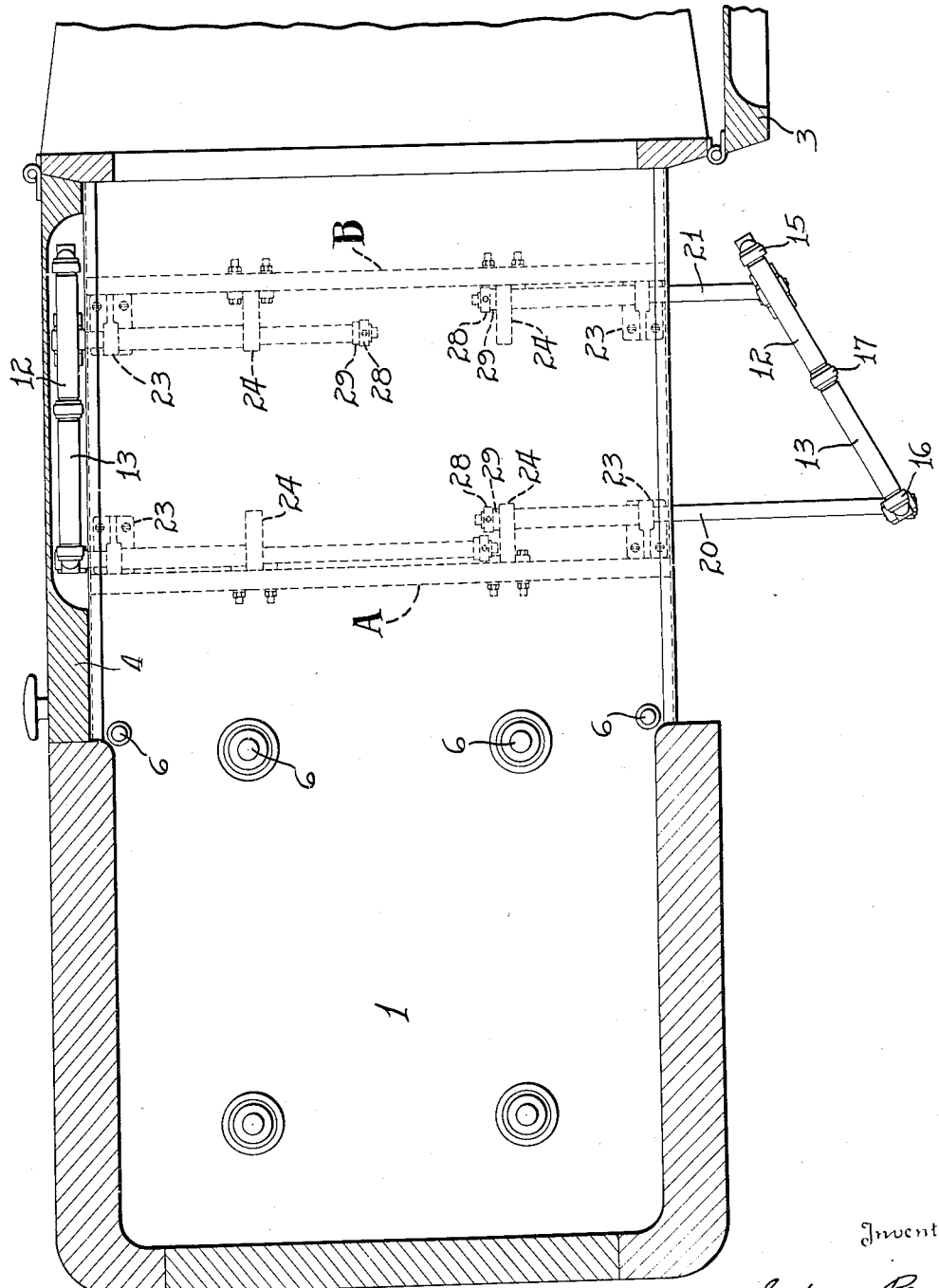
Inventor
Sydney Paul
By Owen & Owen
Attorneys

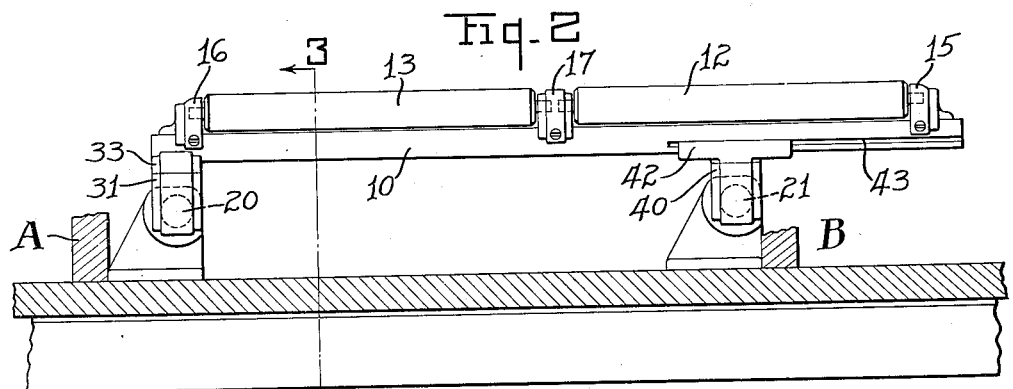
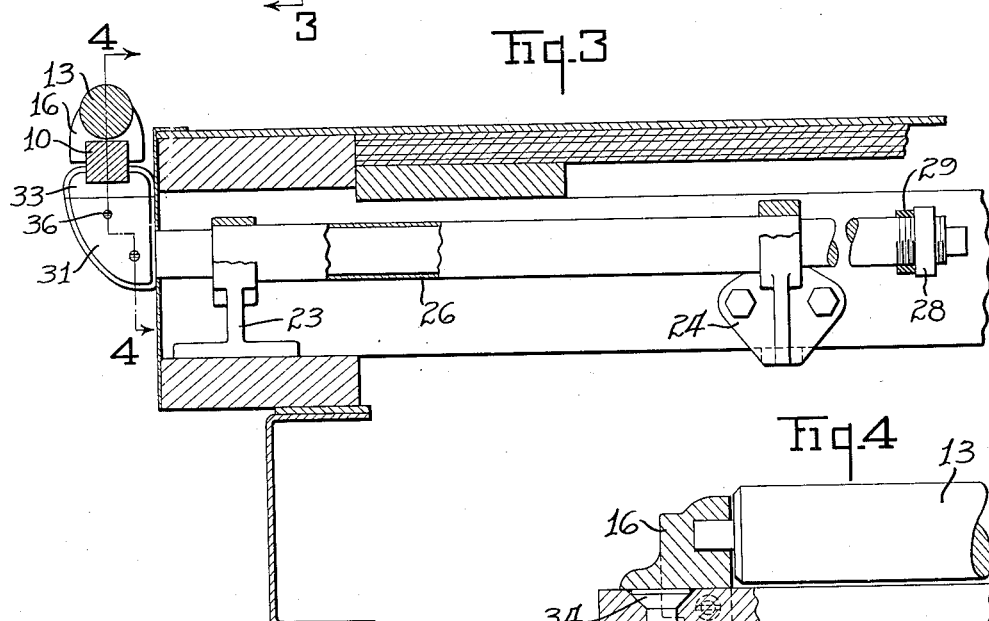
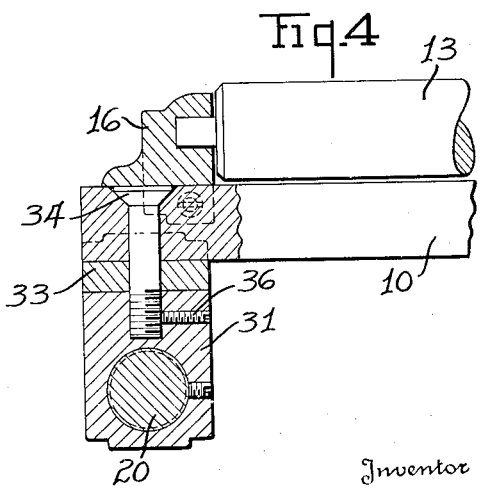
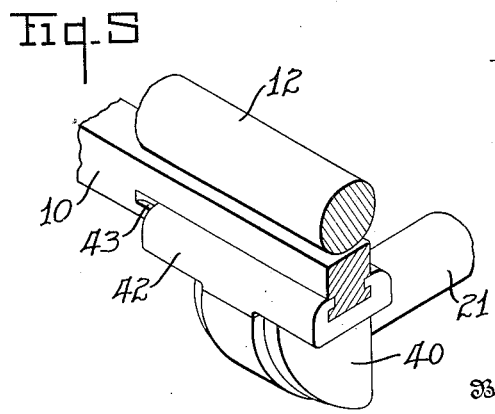

Patented May 7, 1935

2,000,351

UNITED STATES PATENT OFFICE 2,000,351

VEHICLE LOADING DEVICE

Sydney Paul, Lima, Ohio, assignor to Superior Body Company, Lima, Ohio, a corporation of Ohio Application December 5, 1934, Serial No. 756,134

8 Claims. (Cl. 193—42)

This invention relates to vehicle loading devices and is more particularly directed to an apparatus which will facilitate the introduction of a casket into a hearse having a side door.

The primary object of the invention is the provision of movable load supporting means mounted adjacent the loading opening or position of a vehicle and adapted to be moved into loading position by predetermined pivotal and sliding movements.

Another object of the invention is the provision of novel and efficient means to mount a movable roller member so as to guide and limit the movements imparted thereto whenever the device is brought to operative position.

Another object of the invention is the provision of a loading device which operates smoothly and easily and which is adapted to assume an inconspicuous position when not in use.

Another object of the invention is the provision of a loading device which is capable of inexpensive manufacture and is simple and efficient in operation.

Other objects and advantages of the invention will become apparent as the description proceeds, reference being had to the accompanying drawings, in which—

Figure 1 is a fragmentary plan view of a hearse equipped with devices constructed in accordance with the present invention; Fig. 2 is a side elevation of one of the loading devices; Fig. 3 is a partial section on line 3—3 of Fig. 2; Fig. 4 is a fragmentary view, with parts in section, of one supporting member; and Fig. 5 is a fragmentary perspective view of another supporting device.

Referring to the drawings, and particularly to Fig. 1, the present invention is shown in conjunction with a hearse body 1 having side doors 3 and 4 affording entrance to the space in which the casket is to be loaded. Roller members 6 are provided on the floor of the interior to facilitate movement of the casket to its proper position once it has been loaded into the hearse.

It will be appreciated that easy loading of a heavy casket into a hearse is extremely important and that some means is necessary to reduce the effort required in this operation. Various movable attachments for the floor of the hearse have been suggested, but these have the disadvantage of being heavy, cumbersome and expensive. The present invention obviates these disadvantages and provides a device which is easy to operate and performs its task as efficiently as do the more cumbersome attachments.

A supporting cross frame 10 is provided and carries roller members 12 and 13 intermediate its ends, the rollers being journaled in suitable bearing members 15 and 16 on each end of the frame 10 and in a common central bearing member 17. Obviously, the number of roller sections may be varied to suit the requirements of the particular device and is dictated by the consideration that the rollers must operate smoothly under a heavy load.

The frame 10 is supported in a manner hereinafter described on a pair of rod members 20 and 21 spaced apart and adapted to reciprocate in front brackets 23 and rear brackets 24 which are fixed to cross members A and B of the vehicle frame. Thus, two spaced points of support are provided for the sliding rod members. A sleeve 26 is provided to surround the portion of each rod member between the front and rear supporting brackets for the elimination of dirt and other matter which might prevent smooth reciprocation of the rods. At the end of each rod, an adjustably disposed stop means 28 is fixed, and preferably includes a resilient collar 29 to act as a cushioning means when the respective rod reaches the limit of its outward movement.

The present invention is obviously adapted for use with vehicles having side loading positions. In funeral cars, this side loading is advantageous in many respects of convenience, but has been little used because of the restricted space within the hearse in which the casket is received. The limited space makes it necessary to slide and swing the casket into position. Thus, with the present invention, the casket is first pushed into the hearse until it is supported by the roller members 6, and is then swung around to lie parallel to the longitudinal axis of the vehicle.

Inasmuch as the casket is introduced into the interior of the hearse at an angle because of its size, the axis of rotation of the roller members must also be at an angle to prevent binding of the rollers in operation. While the rollers are angularly disposed when in use, they must lie parallel to the body when in their inoperative position, so as to occupy a minimum of space as inconspicuously as possible.

To permit the angular, as well as the outward movement of the loading device relative to the body of the hearse, the rod members 20 and 21 are made of unequal length, so that one will protrude farther from the body than the other when both are at the limit of the movement with the resilient collars 29 contacting the rear brackets 24.

The unequal outward movement of the rod members 20 and 21 necessitate a swinging and sliding of the frame 10. For this reason one end of the frame is mounted for pivotal movement, while the other end is mounted for both pivotal and sliding movements. The pivotal support is illustrated in Fig. 4 and includes a base member 31 fixed to the end of the rod 20. A superimposed rotatable member 33 is held against lateral movements relative to the base 31 by a screw 34, the lower end of which is received in the base 31 and locked against rotation by any suitable means, such as a set screw 36. The rotatable member 33 receives the cross frame member 10 and one of the end bearings 16, so as to form a compact and neat pivotal support for one end of the loading device.

As shown in Fig. 5, the opposite end of the device is supported by a member which includes a base 40 fixed to the rod 21, and which has a pivoted frame receiving jaw part 42 held thereon. The cross frame 10 is slotted for a distance from the end as at 43, so that the inturned jaw portions of the part 42 are received in the slots. Thus, the frame is permitted to slide relative to its support, which latter is free to rotate on the base 40.

When not in use the loading device is pushed in to the position shown in Fig. 1, so that the rollers 12 and 13 are close to the body and out of the way. The adjacent door of the hearse is recessed to receive these parts, as is clearly shown in this figure. When it is desired to use the device to load or unload a casket the operator grasps the rollers, or the cross member 10 and pulls outwardly until the shorter of the two rod members, 21, stops by reason of reaching the limit of its movement allowed by the stop 28. Up to this point, the cross frame 10 and rollers 12 and 13 are parallel to the side of the vehicle. Continued movement of the rod member 20, however, causes the rollers and frame to swing about the support 31 and the free end of the frame to slide between the jaws 42, which latter must pivot about the base 40 to accommodate the change in angular disposition of the parts. Such continued outward movement is stopped at the proper point by the stop member fixed to the inner end of the rod 21, or by any other suitable means. The casket, or other object to be moved may then be placed on the rollers and easily slid into the interior of the vehicle. It will be seen that there is no tendency for the device to move to its closed position when the load is moved over it, since the load causes a binding between the rods and their spaced supporting brackets 23 and 24, and the diagonal force applied to the load tends to bind the rods against the sides of the brackets.

It will thus be seen that I have provided a loading device which is easy to operate, and which is simple and efficient in use. While numerous modifications and changes in the form and disposition of the parts may suggest themselves to those skilled in the art, it should be expressly understood that the described embodiment is shown only by way of illustration, and that such changes may be made without departing from the invention as defined in the appended claims.

Having thus described my invention, what I claim as new, and desire to secure by United States Letters Patent, is:

1. In a vehicle loading device, two spaced supporting rods mounted for predetermined reciprocating movements relative to said vehicle, and a cross frame carried by said supporting rods and having a pivotal connection with one of said rods and a pivotal and sliding connection with the other.

2. In a vehicle loading device, two spaced supporting rods mounted for predetermined unequal reciprocating movements relative to said vehicle, a cross frame carried by said supporting rods and having a pivotal connection with one of said rods and a pivotal and sliding connection with the other, and anti-friction means carried by said cross frame.

3. In a vehicle loading device, spaced supporting means mounted for predetermined unequal movements relative to said vehicle, a cross frame, means to mount an end of said frame for pivotal movements relative to one of said supporting means, and means carried by the other of said supporting means to engage said cross frame intermediate its ends whereby said cross frame is adapted to have pivotal and slidable connection with said last named supporting means.

4. In a vehicle loading device, two spaced supporting rods mounted for predetermined reciprocating movements relative to said vehicle, a cross frame, means having relatively rotatable parts one of which is carried by one end of one of said supporting rods and the other of which is connected to an end of said cross frame, and means carried by the second of said supporting rods to engage said cross frame intermediate its ends whereby said cross frame is adapted to have pivotal and sliding movements relative to said second supporting rod.

5. In a vehicle loading device, two spaced supporting rods mounted for predetermined reciprocating movements relative to said vehicle, a cross frame, means having relatively rotatable parts one of which is carried by one end of one of said supporting rods and the other of which is connected to an end of said cross frame, and a second means having a part fixed to said second supporting rod and a relatively rotatable jaw member carried by said part, said cross frame being slotted adjacent one end to receive said jaw member whereby said cross frame is adapted to have pivotal and sliding movements relative to said second supporting rod.

6. In a vehicle loading device, two spaced supporting rods mounted for predetermined reciprocating movements relative to the vehicle, and a cross frame having pivotal connection with each of said rods and a sliding connection with at least one of said rods.

7. In a vehicle loading device, two spaced supporting rods mounted for predetermined reciprocating movements relative to the vehicle, a cross frame having pivotal connection with each of said rods and a pivotal and sliding connection with at least one of said rods, and anti-friction means carried by said cross frame.

8. In a vehicle loading device, two spaced supporting rods mounted for predetermined reciprocating movements relative to the vehicle, a cross frame, separate means carried by each supporting rod to engage said cross frame and mount said frame for pivotal movements relative to each of said rods, at least one of said means having a part slidably engaged with said cross frame whereby said frame is further adapted to have sliding movement transversely of at least one of said supporting rods.

SYDNEY PAUL.